United States Patent Office 3,465,047
Patented Sept. 2, 1969

3,465,047
PROCESS FOR PRODUCING 2,6-XYLENOL
Ken Ito and Hiroshi Kaminaka, Toyonaka-shi, Norio Kotera, Amagasaki-shi, Kosuke Shigehiro and Hiroshi Kuruma, Takarazuka-shi, and Kenji Tanimoto, Minoo-shi, Japan, assignors to Sumitomo Chemical Company, Ltd., Osaka, Japan, a corporation of Japan
No Drawing. Filed Dec. 14, 1966, Ser. No. 601,574
Claims priority, application Japan, Dec. 28, 1965, 40/81,085
Int. Cl. C07c 37/04, 143/34
U.S. Cl. 260—621                    5 Claims

ABSTRACT OF THE DISCLOSURE 2,6-xylenol is produced by tertiary alkylating m-xylene to form 3,5-dimethyl-tertiary-alkylbenzene, sulfonating the resulting 3,5-dimethyl-tertiary-alkylbenzene to form 2,6-dimethyl-4-tertiary-alkylbenzene sulfonic acid, fusing the resulting 2,6-dimethyl-4-tertiary-alkylbenzene sulfonic acid with an alkali to form 2,6-dimethyl-4-tertiary-alkylphenol, and de-tertiary alkylating the resulting 2,6-dimethyl-4-tertiary-alkylphenol.

---

The present invention relates to a novel process for producing 2,6-xylenol. 2,6-xylenol is useful as the starting material of synthetic resin, such as polyphenylene oxide. 2,6-xylenol is contained in coal or petroleum tar, but is difficultly separated from them by extraction because 2,6-xylenol is weak in acidity and also by distillation because there are many compounds having boiling points similar to that of 2,6-xylenol.

For these reasons various kinds of the processes for producing 2,6-xylenol were proposed, in which o-cresol, phenol, p-chlorophenol, 2,6-dimethyl benzoic acid or cyclohexanone was used as the starting material.

However there were many difficulties in these known processes such as that the yields of 2,6-xylenol were low and difficultly removable by-products were produced and they were unsatisfactory.

In order to overcome these difficulties, the present inventors studied a process for producing 2,6-xylenol.

It is one object of the present invention to provide a novel process for producing pure 2,6-xylenol in good yield and in low cost.

Other objects will be apparent from the following description.

The present process consists of a combination of several steps of the reaction starting from m-xylene as shown below.

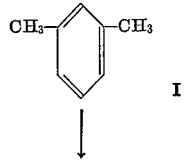

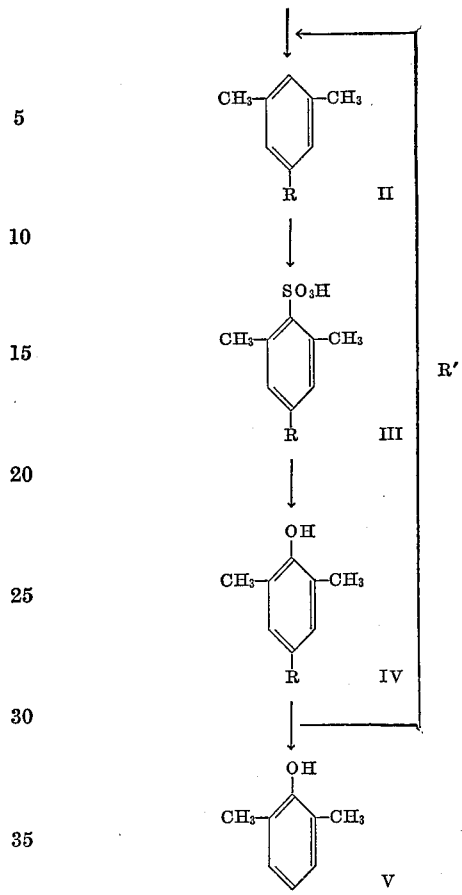

wherein R means a tertiary alkyl having 4 to 6 carbon atoms and R' means a tertiary-alkylating agent which is derived from the said tertiary alkyl represented by R.

The present invention provides a novel process for producing 2,6-xylenol, which comprises tertiary alkylating m-xylene with a tertiary olefin, a tertiary-alkyl halide or a tertiary-alkylalcohol to form 3,5-dimethyl-tertiary-alkylbenzene; sulfonating the resulting 3,5-dimethyl-tertiary-alkylbenzene with concentrated sulfuric acid, fuming sulfuric acid or mixture thereof to form 2,6-dimethyl-4-tertiary-alkylbenzene sulfonic acid; fusing the resulting 2,6 - dimethyl-4-tertiary-alkylbenzene sulfonic acid with sodium hydroxide, potassium hydroxide or mixture thereof to form 2,6-dimethyl-4-tertiary-alkylphenol; and de-tertiary alkylating the resulting 2,6-dimethyl-4-tertiary-alkylphenol to form 2,6-xylenol.

The present process is described in order of the steps as follows.

The first step of the present process is a tertiary alkylation of m-xylene to form 3,5-dimethyl-tertiary-alkylbenzene.

Formation of any by-product is little or not at all found at this tertiary alkylation step.

The mole ratio of m-xylene to a tertiary-alkylating agent is between 1:1.05 and 1:1.30. Reaction period of time is 0.5 to 5 hours. The tertiary-alkylation takes place selectively at the 5-position of the benzene nucleus of m-xylene, because of the characteristic property of the tertiary-alkyl and 3,5-dimethyl-tertiary-alkylbenzene is obtained in a high yield as much as theory.

The tertiary-alkylation is carried out in the presence of a Friedel-Crafts catalyst such as sulfuric acid, phosphoric acid, aluminum trichloride, zinc chloride, stannic chloride, titanium tetrachloride or boron trifluoride.

The tertiary-alkylation may be carried out in either of liquid phase or gas phase at the reaction temperature of −20° to 300° C. In case tertiary butyl is employed, a sufficient result may be obtained by the liquid phase reaction at the reaction temperature of 0° to 80° C. It is the most general method for the tertiary butylation that tertiary-butyl chloride is added dropwise into m-xylene containing aluminum trichloride as catalyst in an amount of 0.5 to 5.0% based on the weight of m-xylene kept at a temperature of 40° to 60° C., or that isobutylene is introduced into m-xylene containing concentrated sulfuric acid of from equal amount to one-fifth amount of the weight of m-xylene kept at a temperature of 0° to 10° C.

About the purity of m-xylene employed in the present process, even if m-xylene containing p-xylene or o-xylene as the impurity is employed, objective 2,6 - xylenol may be obtained in high purity, because a tertiary alkyl is hardly introduced into p-xylene. 2,3-xylenol derived from o-xylene by the present process is removed easily from 2,6-xylenol by distillation at the final purifying procedure. Further, ethylbenzene, which is considered to be contained as an impurity in m-xylene and is converted to the ditertiary alkyl substituted compound of ethylbenzene having higher boiling point than that of 3,5-dimethyl-tertiary-alkylbenzene, is removed easily by distillation.

From these reasons, even if the purity of m-xylene is not especially high, pure 2,6-xylenol may be obtained without any trouble.

The second step of the present process is sulfonation of 3,5-dimethyl-tertiary-alkylbenzene to form 2,6-dimethyl-4-tertiary-alkylbenzene sulfonic acid. In this step sulfonic radical is introduced selectively at the 4-position of the benzene nucleus, that is to say, between the two methyl radicals of the 3,5-dimethyl-tertiary-alkylbenzene, because of the specific property of the tertiary alkyl and 2,6-dimethyl-4-tertiary-alkylbenzene sulfonic acid is obtained in good yield.

The sulfonation is carried out by reacting 3,5-dimethyl-tertiary-alkylbenzene with concentrated sulfuric acid, fuming sulfuric acid or mixture thereof in which the concentration of sulfuric acid must be above 90%, at a temperature of 0° to 100° C., particularly at about 50° C., without any difficulty.

The mole ratio of 3,5-dimethyl-tertiary-alkylbenzene to sulfuric acid is between 1:2 and 1:4. Reaction period of time is 1 to 5 hours.

The order of addition is optional whether 3,5-dimethyl-tertiary-alkylbenzene is added to sulfuric acid or sulfuric acid is added to 3,5-dimethyl-tertiary-alkylbenzene.

The third step of the present process is alkali fusion of 2,6-dimethyl-4-tertiary-alkylbenzene sulfonic acid to form 2,6-dimethyl-4-tertiary-alkylphenol. This alkali fusion is carried out by fusing 2,6-dimethyl-4-tertiary-alkylbenzene sulfonic acid with alkali at 250°–350° C., preferably at 280° to 320° C. for 1 to 6 hours. An alkali employed in this alkali fusion is sodium hydroxide or potassium hydroxide or mixture thereof. The mole ratio of the sulfonic acid compound to alkali is between 1:2 and 1:4.

The final step of the present process is de-tertiary alkylation of 2,6-dimethyl-4-tertiary-alkylphenol in the presence of a catalyst to form objective 2,6-xylenol. This de-tertiary alkylation is carried out in the presence of a catalyst such as an aromatic sulfonic acid, for example, benzene sulfonic acid, p-toluene sulfonic acid or naphthalene mono-sulfonic acid, sulfuric acid, aluminium trichloride or the like which is employed in the above-mentioned tertiary alkylation of m-xylene, and among these catalysts benzene sulfonic acid, p-toluene sulfonic acid, naphthalene mono-sulfonic or sulfuric acid is particularly effective. If the reaction is carried out by selecting the suitable condition in the presence of alkali as the catalyst the de-tertiary alkylation may proceed similarly to case in which the reaction is carried out in the presence of the above mentioned catalyst. The catalyst is used in an amount of 0.5 to 5.0% based on the weight of 2,6-dimethyl-4-tertiary-alkylphenol.

The de-tertiary alkylation proceeds at a temperature of above 150° C., preferably at a temperature of about 200° C. within 2 to 8 hours.

If the de-tertiary alkylation is carried out at atmospheric pressure, a small amount of the unreacted material is remained in the crude product. In this case the similar treatment is repeated after removing 2,6-xylenol from the reaction system, as the result the yield of the de-tertiary alkylation step based on the amount of the consumed 2,6-dimethyl-4-tertiary-alkylphenol is above 95% of the theory.

The crude product is distilled in order to remove impurities such as a small amount of tertiary olefin polymer produced as a by-product by the present process and unreacted material, whereby the pure objective 2,6-xylenol is obtained. The formation of 2,4-xylenol and 3,5-xylenol, which may be expected, are not found in the present process.

It is interesting in the present process that the tertiary olefin, which is produced at the de-tertiary alkylation, may be recovered, and the tertiary olefin or the corresponding tertiary alkyl halide obtained by introducing the tertiary olefin into a hydrogen halide aqueous solution, may be easily recycled to the next tertiary alkylation of m-xylene. Further if the tertiary alkylation of m-xylene is carried out by using a tertiary alkyl halide, the hydrogen halide is generated and is recovered, and the recovered hydrogen halide may be used to convert the tertiary olefin to the corresponding tertiary alkyl halide. Therefore the amount of the tertiary alkylation agent consumed in the tertiary alkylation of m-xylene is as small as negligible.

These facts show that the materials consumed in the present process are only m-xylene, sulfuric acid and alkali agent.

It is distinct from these illustrations that one of the advantages of the present process consists in the said economical property.

Further the process of the present invention is very advantageous for industrial production of 2,6-xylenol in that the present process is based on only the specific steric effect of a tertiary alkyl and the reaction property thereof and does not consist of any especial or difficult treatment.

If m-xylene is sulfonated directly without introducing a tertiary alkyl to m-xylene and the resulting m-xylene sulfonic acid is fused with alkali to form xylenol, the main product is 2,4-xylenol and it contains various kinds of by-products. Further, if a secondary alkyl instead of a tertiary alkyl is introduced to m-xylene and the resulting secondary alkyl substituted m-xylene is subjected to the process similar to the present process, 2,6-xylenol is not obtained so purely as in the present process, because the selectivity of direction of the reaction by employing a secondary alkyl is not so high as compared with the case employing a tertiary alkyl.

The following examples are given not to limit the present invention but to illustrate the present invention more definitely. All parts are by weight.

EXAMPLE 1

Stage 1

0.8 part of aluminum trichloride as a catalyst was added to 106 parts of m-xylene. 102 parts of tertiary-butyl chloride was added dropwise to the above mixture within 1 hour under stirring at 50°–51° C. As the progress of the reaction, it was found that hydrogen chloride was generated. After the dropping was finished the stirring was contained for additional 1 hour to complete the reaction. After the reaction was over, the reaction mixture was poured into 150 parts of water to decompose the catalyst employed. The organic layer was separated from the aqueous layer and was washed with dilute aqueous alkali solution and with water. The organic layer was dried and concentrated to recover the unreacted material. 3,5-dimethyl-tertiary-butylbenzene was obtained as the residue.

The yield of the tertiary alkylation was 97% based on the amount of consumed m-xylene.

Stage 2

300 parts of 98% sulfuric acid was added dropwise to 150 parts of 3,5-dimethyl-tertiary-butylbenzene within 1 hour under stirring. At the time of the addition, the elevation of the temperature of the reaction mixture was recognized, but the temperature of the reaction mixture was controlled to be maintained at 55° C. After the dropwise addition the reaction mixture was stirred at 55° C. for 2 hours. After the reaction was over, the reaction mixture was poured into 150 parts of saturated sodium chloride aqueous solution, and the precipitated sodium salt of 2,6-dimethyl-4-tertiary-butylbenzene sulfonic acid was collected by filtration, and washed with water.

Stage 3

Crude 2,6-dimethyl-4-tertiary-butylbenzene sulfonic scid obtained in the Stage 2 was mixed with 155 parts of potassium hydroxide and the mixture was fused at 300° C. for 2 hours.

After the fusion the reaction mixture was cooled and poured into 300 parts of water to obtain an aqueous solution thereof. The aqueous solution was acidified with hydrochloric acid and the resulting oil layer was separated from the aqueous layer, and dried, to yield 127 parts of 2,6-dimethyl-4-tertiary-butylphenol, M.P. 82°–3° C., B.P. 239.8° C.

Stage 4

5 parts of p-toluene sulfonic acid was added to 100 parts of 2,6-dimethyl-4-tertiary-butylphenol obtained in the Stage 3.

The mixture was heated under stirring and boiled. When the temperature of the mixture was raised up to 240°–245° C., it was recognized that isobutylene was generated. As the progress of the de-tertiary-butylation of 2,6-dimethyl-4-tertiary-butylphenol, it was recognized that the temperature of the mixture lowered slowly. After seven hours from the beginning of de-tertiary-butylation, the temperature of the mixture lowered to about 215° C. and the generation of isobutylene stopped and the reaction was over. The reaction product was analyzed, as the result it was found that the reaction product consisted of 2,6-dimethyl-4-tertiary-butylphenol 12.6%, 2,6-xylenol 85.1%, 2-methyl-4-tertiary-butylphenol 0.6%, o-cresol 1.3% and other components 0.4% (all percents were based on the weights), and the selection ratio of this de-tertiarybutylation to 2,6-xylenol was 97.4%.

Each of 2,6-xylenol and 2,6-dimethyl-4-tertiary-butylphenol was separated respectively from the crude reaction product by fractional distillation, and 2,6-dimethyl-4-tertiary-butylphenol was subjected to detertiarybutylation by the similar treatment again, and the similar result was obtained.

In case benzene sulfonic acid or naphthalene monosulfonic acid was used in the above treatment instead of p-toluene sulfonic acid, the similar result was obtained.

Isobutylene, which was produced in the Stage 4, was changed to tertiary butyl chloride by introducing into hydrochloric acid aqueous solution which had been recovered at the process of tertiary butylation of m-xylene, and the recovered tertiary butyl chloride was usable in the process of tertiary butylation of m-xylene at the next time.

EXAMPLE 2

30 parts of concentrated sulfuric acid was added to 106 parts of m-xylene. To this mixture 56 parts of isobutylene was blown at −5° to 0° C. within 1 hour under vigorous stirring. After the blowing of isobutylene the oily layer was separated from aqueous layer and washed with dilute alkali aqueous solution and with water.

The oil was subjected to fractional distillation. After removing a small amount of water, un-reacted m-xylene and isobutylene polymer, 3,5 - dimethyl-tertiary-butylbenzene was obtained as the distillate having the boiling point of 205°–7° C.

The yield was 96% based on the amount of consumed m-xylene. The thus obtained 3,5-dimethyltertiary-butylbenzene was subjected to sulfonation, alkali fusion and deisobutylation in similar way as in Example 1 to yield 2,6-xylenol, yield 71% based on m-xylene.

What we claim is:

1. A process for producing 2,6-xylenol of high purity, which comprises reacting m-xylene with a tertiary compound selected from the group consisting of a tertiary compound selected from the group consisting of a tertiary olefin having 4 to 6 carbon atoms and a tertiary alkyl halide having 4 to 6 carbon atoms at a maximum temperature of about 80° C. in the presence of a Friedel-Crafts catalyst to obtain 1,3-dimethyl-5-tertiary-alkylbenzene, reacting the 1,3-dimethyl-5-tertiary-alkylbenzene with a compound selected from the group consisting of concentrated sulphuric acid, fuming sulphuric acid, and a mixture thereof at about 0° to 100° C. to obtain 2,6-dimethyl-4-tertiary-alkylbenzene sulfonic acid, mixing and heating the 2,6-dimethyl-4-tertiary-alkylbenzene sulfonic acid with an alkali selected from the group consisting of caustic soda, caustic potash and a mixture thereof at about 250° to 350° C. to obtain 2,6-dimethyl-4-tertiary-alkylphenol, heating the 2,6-dimethyl-4-tertiary-alkylphenol at about 150° to 245° C. in the presence of a catalyst selected from the group consisting of concentrated sulphuric acid and an aromatic sulfonic acid, and then rectifying the reaction mixture from the preceding step to recover 2,6-xylenol.

2. A process according to claim 1, wherein a tertiary olefin is generated in the course of the step of heating the 2,6-dimethyl-4-tertiary-alkylphenol, and recycling said tertiary olefin for use in the step of reacting m-xylene with a tertiary compound.

3. A process according to claim 1, wherein said tertiary compound contains butyl groups.

4. A process according to claim 1, wherein said tertiary compound is isobutylene.

5. A process according to claim 1, wherein the tertiary compound is a tertiary butyl halide, and the corresponding hydrogen halide is generated in the course of the reaction of the tertiary butyl halide with m-ylene, recovering said hydrogen halide in an aqueous solution, and reacting the aqueous solution of said hydrogen halide with isoutylene recovered from the step of heating the 2,6-dimethyl-4-tertiary alkylphenol to produce tertiary butyl halide, and recycling the produced tertiary butyl halide for use in reaction with m-xylene.

(References on following page)

References Cited

UNITED STATES PATENTS 2,603,662  7/1952  Stevens _____ 260—621 X
2,816,940  12/1957  Schlatter _____ 260—671 X

OTHER REFERENCES

Fieser et al.: Organic Chemistry, Reinhold Publishing Co., New York, 1956, p. 625.

LEON ZITVER, Primary Examiner

N. P. MORGENSTERN, Assistant Examiner

U.S. Cl. X.R.

260—505, 671